July 12, 1932.  E. CLARK  1,866,799
RUBBER CUTTING MACHINE
Filed Jan. 6, 1930
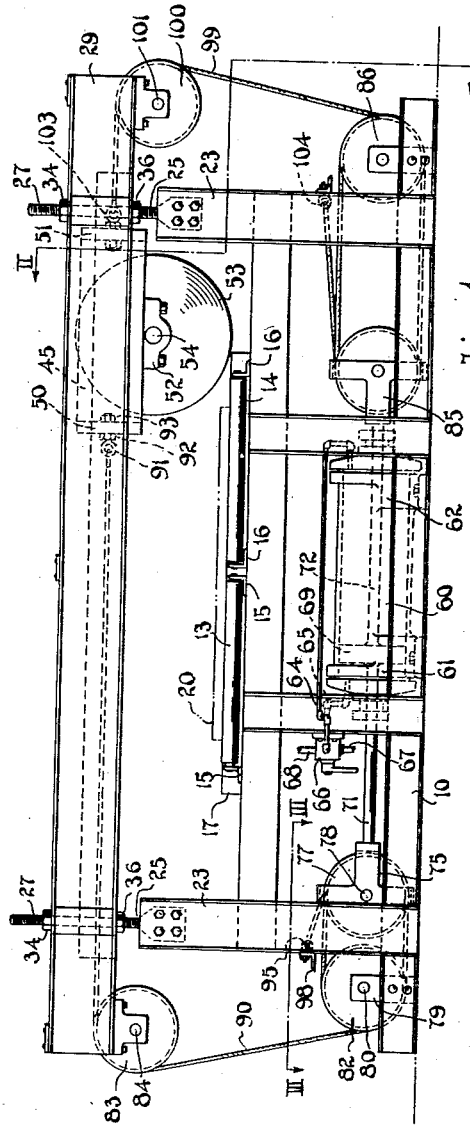
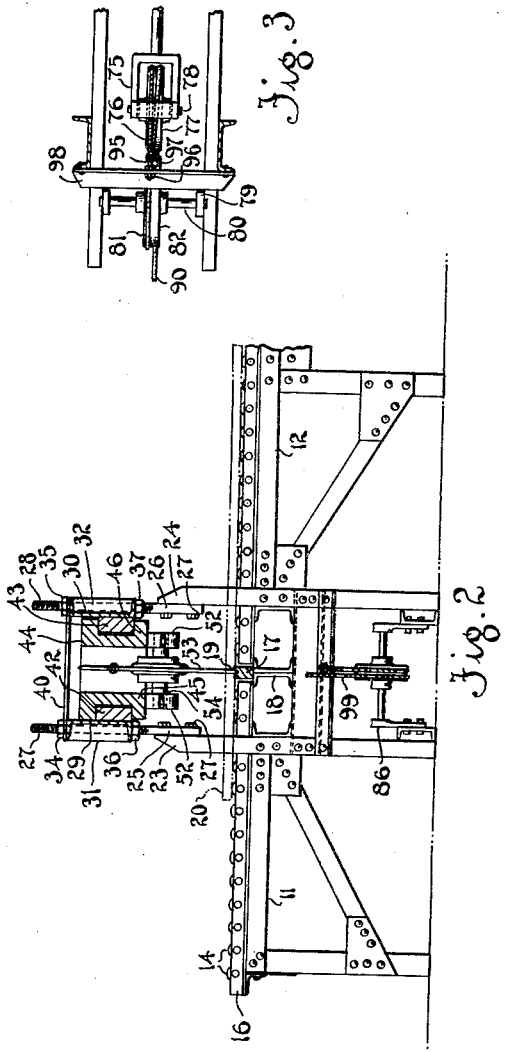
Inventor
Elmer Clark
By
Attorney Patented July 12, 1932

1,866,799

UNITED STATES PATENT OFFICE

ELMER CLARK, OF AKRON, OHIO, ASSIGNOR TO THE GOODYEAR TIRE & RUBBER COMPANY, OF AKRON, OHIO, A CORPORATION OF OHIO

RUBBER CUTTING MACHINE

Application filed January 6, 1930. Serial No. 418,738.

This invention relates to machines for manipulating elongate strips of rubber and relates particularly to a machine of the above-designated character which is adapted for cutting rubber in the uncured of crude state.

The object of the invention is to provide a machine which will efficiently cut elongate slabs of rubber or other pliable material into shorter lengths in order to obviate the tedious and laborious work of severing such strips of rubber manually.

The compounding of rubber with various chemicals necessitates considerable cutting of rubber from slabs thereof in order that the correct quantity of rubber will be employed in the compound. Prior to this invention, it has been the practice for compounders to sever rubber from a slab thereof by manual means such as large knives of the butcher-knife. Manifestly, repeated cutting of rubber required considerable time and, moreover, was a tedious and laborious operation.

According to this invention a machine has been provided which will obviate the manual cutting of rubber which was heretofore necessary. Primarily, the machine comprises a support for the rubber, and a circular cutting disc rotatably supported in a crosshead movable in guideways disposed above the support. A fluid motor having piston rods projecting from each end, has operative connections to the cross-head for reciprocating it. Such connections comprises cables connected to the ends of the piston rods and to the cross-head, respectively. By means of such a machine, the tedious and laborious operations previously found necessary for cutting rubber are entirely obviated.

For a better understanding of the invention, reference may now be had to the accompanying drawing, forming a part of this specification, of which:

Figure 1 is a front elevational view of a machine constructed according to one embodiment of the invention;

Figure 2 is a cross-sectional view taken substantially along the lines II—II of Figure 1; and Figure 3 is a cross-sectional view taken substantially along the line III—III of Figure 1.

Referring to Figures 1 and 2, an elongate framework 10 is provided intermediate its ends with laterally projecting portions 11 and 12, each of which has two series of horizontally disposed rollers 13 and 14. The rollers of each series are journalled in a pair of angle bars 15 and 16 which are rigidly secured to the frame work. The adjacent end rollers, as well as the ends of the angle bars in which they are journalled, of the respective pairs of series supported by the frame portions 11 and 12, are sufficiently spaced to accommodate a bar 17 which is rigidly supported upon an I-beam 18 of the frame work. The upper surface of the bar 17 in a direction parallel to the axes of the rollers is grooved, as indicated at 19. The rollers are adapted to support a slab of rubber 20, which is movable thereover and also across the bar 17.

As best shown by Fig. 2, each end of the frame work 10 is provided with upwardly projecting spaced channel irons 23 and 24 to which vertically projecting rods 25 and 26 are rigidly secured, by means of bolts 27. The upper end of the rods 25 and 26 are threaded, as indicated in 27 and 28, respectively. These threaded rods project through the flanges of horizontally disposed channel irons 29 and 30, respectively, with the web plates of the channel irons disposed in vertical positions and adjacent each other. Integral reinforcements 31 and 32 are provided between the flanges of the channel irons 29 and 30, respectively, at the points where the threaded rods 27 and 28 project through the flanges. The vertical position of the channel irons 29 and 30 is controlled by nuts 34 and 35 on the upper ends of the rods 27 and 28, respectively, and corresponding nuts 36 and 37 on the lower ends of the rods. Bars 40 connect upper flanges of the channel irons 29 and 30, in order to insure proper spacing thereof.

The web plates 29 and 30 of the channel irons are provided on their adjacent sides respectively with rectangular guideways 42 and 43. These guideways are adapted to slidably support between them a cross-head 44 which comprises a pair of spaced channel bars 45 and 46, the channels of which respectively engage the guideways 42 and 43. As best shown by Figure 1, the channel bars 45 and 46 are retained in spaced relation by plates 50 and 51, which are rigidly secured to their ends. Each of the channel bars 45 and 46 has a downwardly projecting bearing bracket 52 for rotatably supporting a shaft 54 having a disc 53 rigidly secured thereto. It will be observed that the disc, although of considerable diameter, is free to rotate between the channel bars 45 and 46 and the end plates 50 and 51 connecting the ends of said channel bars. The edge of the disc 53 is sharpened and is adapted to roll in the groove 19 of the bar 17. Hence, when a slab of rubber 20, is disposed transversely of the bar 17, with the disc 53 in its position shown by Fig. 1, movement of the disc along the bar 17 will effectively sever the rubber.

Movement of the cross-head 44 and consequently the disc 53 is effected by a fluid motor 60. This motor is provided with flanges 61 and 62 which are rigidly secured to a stationary support such as a floor. Opposite ends of the cylinder are connected by conduits 64 and 65 to a suitable four-way valve 66 to which also is connected a discharge conduit 67 and a conduit 68 for admitting fluid to the interior chamber of the valve. The operation of such a valve is well known and need not be explained, other than to state that fluid under pressure may be admitted to either end of the cylinder, and, likewise, discharged from the opposite end upon operation of the valve. The cylinder is provided with a piston 69 from opposite ends of which piston rods 71 and 72 project. The end of the piston rod 71 opposite the end secured to the piston 69 is rigidly secured to a sheave block 75 which, as best shown by Fig. 3, comprises a pair of sheaves 76 and 77 rotatably mounted upon a shaft 78, which is journalled in the sheave block. A second sheave block 79 is rigidly secured to one end of the framework 10 and rotatably supports a shaft 80 which in turn rotatably supports a pair of sheaves 81 and 82. The sheave blocks 75 and 79 are so located that the sheaves 76 and 81 are disposed substantially in alignment and, likewise, the sheaves 77 and 82 disposed substantially in alignment.

The end of the piston rod 72 opposite the end secured to the piston 69, is secured to a sheave block 85, similar to the sheave block 75. Also, the end of the framework 10 opposite that end supporting the sheave block 79 is provided with a sheave block 86 similar to the latter.

The end plate 50 of the cross-head 44 is operatively connected to the sheave block 75 of the piston rod 71 by means of a cable 90, one end of which engages an eye bolt 91 rigidly secured to the plate 50 by nuts 92 and 93. As best shown by Fig. 3, the cable 90 is trained over a sheave 83 that has a journal connection 84 to the channels 29 and 30 and passes under the sheave 82, around the sheave 77, then over the sheave 81, then over the sheave 76, and finally its end is secured to an eye bolt 95 secured by nuts 96 and 97 to a bar 98 comprising part of the framework 10. In a similar manner, the end plate 51 of the cross-head 44 is operatively connected to the sheave block 85 by means of a cable 99, trained about a sheave 100 that has a journal connection 101 to the channels 29 and 30. Opposite ends of the cable 99 are connected to the plate 51 and framework 10, as indicated at 103 and 104, respectively.

In operation of the above-described mechanism, prior to disposing a slab of rubber 20 upon the rollers and bar 17, fluid is admitted in to one end or the other of the cylinder 60 until the disc 53 is located at one end or the other of the framework. After disposing a slab of rubber upon the bar 17, fluid is admitted into the end of the cylinder adjacent which the piston is then disposed, and, as a result, the piston moves to the opposite end of the cylinder adjacent which the piston is then disposed, and, as a result, the piston moves to the opposite end of the cylinder. This also causes movement of the disc 53 along the groove 19 of the bar 17, consequently severing the slab of rubber 20 into two parts. It is apparent that a slab of rubber 20 may be moved rapidly over the rollers 13 and 14 and the bar 17, between strokes of the cross-head 44, and that strips of rubber may be cut from the slab in rapid order. It is also apparent that the rigidity of the construction permits cutting of large slabs of rubber which would be very difficult to cut manually. Moreover, by means of the sheave blocks, movement of the piston 69 a predetermined distance, such as the length of the cylinder, results in a much greater movement of the cross-head and hence that a cylinder of relatively small length may be employed.

Although only the preferred form of the invention has been illustrated, and that form described in detail, it will be apparent to those skilled in the art that the invention is not so limited, but that various modifications may be made therein without departing from the spirit of the invention or from the scope of the appended claims.

What I claim is:

1. An apparatus for cutting rubber or the like comprising a frame, a plurality of horizontally disposed rollers journaled on the frame and comprising a bed for the material to be cut, a pair of parallel guides, means for adjustably securing each end of the guides to the frame in superimposed relation thereto and parallel to the axes of the rollers, a crosshead carried by the guides, a cutting disc freely journaled on the crosshead, a cutting bar having a groove therein cooperating with the cutting disc, the bar being fixed on the frame between the rollers in alignment with the guides, and means for reciprocating the crosshead.

2. An apparatus for cutting rubber or the like comprising means for supporting the material, cutting means mounted for reciprocating movement over the supporting means, and means for reciprocating the cutting means which include a fluid motor mounted below the supporting means, the fluid motor having one piston, rods extending from opposite ends thereof, and block and tackle means connecting the ends of the rods to opposite sides of the cutting means so that a relatively short stroke of the piston will transmit a long cutting stroke to the cutting means.

3. An apparatus for cutting rubber or the like comprising a frame, a plurality of horizontally disposed rollers journaled on the frame and comprising a bed for the material to be cut, a pair of parallel guides, means for adjustably securing each end of the guides to the frame in superimposed relation thereto and parallel to the axes of the rollers, a crosshead carried by the guides, a cutting disc freely journaled on the crosshead, a cutting bar having a groove therein cooperating with the cutting disc, the bar being fixed on the frame between the rollers in alignment with the guides, and means for reciprocating the crosshead including a fluid motor fixed to the frame parallel to, but below the cutting bar, the fluid motor having one piston with a rod extending therefrom out of each end of the motor, and block and tackle means connecting the rods to opposite ends of the crosshead for providing a relatively short movement of the piston to transmit a comparatively long cutting movement to the crosshead.

In witness whereof, I have hereunto signed my name.

Signed at Akron, in the county of Summit and State of Ohio, U. S. A., this 4th day of January, 1930.

ELMER CLARK.